(12) United States Patent
Castillo et al.

(10) Patent No.: US 10,580,397 B2
(45) Date of Patent: Mar. 3, 2020

(54) GENERATION AND VISUALIZATION OF DISTRACTION INDEX PARAMETER WITH ENVIRONMENTAL RESPONSE

(71) Applicant: Plantronics, Inc., Santa Cruz, CA (US)

(72) Inventors: Erick Castillo, Santa Cruz, CA (US); Collin Robert Brown, Soquel, CA (US); Evan Harris Benway, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/986,704

(22) Filed: May 22, 2018

(65) Prior Publication Data

US 2019/0362701 A1    Nov. 28, 2019

(51) Int. Cl.
*G10K 11/175* (2006.01)
*G10L 25/84* (2013.01)
*H04R 1/40* (2006.01)
*G06F 3/0484* (2013.01)

(52) U.S. Cl.
CPC .......... *G10K 11/175* (2013.01); *G06F 3/0484* (2013.01); *G10L 25/84* (2013.01); *H04R 1/403* (2013.01); *H04R 1/406* (2013.01)

(58) Field of Classification Search
CPC ..... G10K 11/175; G06F 3/0484; G10L 25/84; H04R 1/403; H04R 1/406; H04R 29/008
USPC ........................................................ 381/73.1
See application file for complete search history.

(56) References Cited

U.S. PATENT DOCUMENTS

| | | | | |
|---|---|---|---|---|
| 4,319,088 A | * | 3/1982 | Orfield ................. | G10K 11/175 381/73.1 |
| 8,194,866 B2 | * | 6/2012 | Smith ....................... | H04S 7/40 381/56 |
| 2006/0009969 A1 | * | 1/2006 | L'Esperance ........ | G10K 11/175 704/226 |
| 2008/0002836 A1 | * | 1/2008 | Moeller ............... | G10K 11/175 381/73.1 |
| 2009/0097671 A1 | * | 4/2009 | Paradiso ................. | H04M 1/19 381/73.1 |
| 2010/0135502 A1 | | 6/2010 | Keady et al. | |
| 2011/0188666 A1 | | 8/2011 | Mason et al. | |
| 2014/0192990 A1 | | 7/2014 | Cheng | |

(Continued)

FOREIGN PATENT DOCUMENTS

WO    WO 2011/050401 A1    5/2011

*Primary Examiner* — Jason R Kurr
(74) *Attorney, Agent, or Firm* — Chuang Intellectual Property Law

(57) ABSTRACT

Methods and apparatuses for visualizing distractions are described. In one example, audio data is received from microphones in an open space. A human speech distractor presence is identified by one or more of: (a) detecting voice activity from the audio data, (b) receiving motion sensor data from motion sensors in the open space and detecting motion activity from the motion sensor data, or (c) receiving video sensor data from video sensors in the open space and detecting a human presence from the video data. A source location of the human speech distractor presence within the open space is identified utilizing one or more of the audio data, the motion sensor data, or the video data. A distraction index parameter is generated from the audio data. The distraction index parameter is visually indicated on an open space map at the source location of the human speech distractor presence.

17 Claims, 11 Drawing Sheets

(56) References Cited

U.S. PATENT DOCUMENTS

| | | | |
|---|---|---|---|
| 2014/0362999 A1* | 12/2014 | Scheper | G08B 21/182 |
| | | | 381/56 |
| 2015/0223000 A1 | 8/2015 | Bran et al. | |
| 2015/0287421 A1 | 10/2015 | Benway et al. | |
| 2017/0019744 A1* | 1/2017 | Matsumoto | H04R 29/008 |
| 2017/0099556 A1* | 4/2017 | Cierna | H04R 29/004 |
| 2017/0372242 A1* | 12/2017 | Alsubai | H04W 4/70 |

\* cited by examiner

Distraction Visualization Table 26

| Location/ Region 302 | Motion 304 | VAD 306 | Facial Presence 308 | Noise Level (dB) 310 | Distraction SNR 312 |
|---|---|---|---|---|---|
| Location A1 | No | No | No | Noise Level 1 | -- |
| Location A2 | Yes | Yes | Yes | Noise Level 2 | DSNR2 |
| Location A3 | No | No | No | Noise Level 3 | -- |
| Location A4 | No | No | No | Noise Level 4 | -- |
| . | . | . | . | . | . |
| . | . | . | . | . | . |

FIG. 3

GENERATION AND VISUALIZATION OF DISTRACTION INDEX PARAMETER WITH ENVIRONMENTAL RESPONSE

BACKGROUND OF THE INVENTION

Soundscaping—the introduction of background sound in order to reduce speech intelligibility, increase speech privacy, and increase acoustical comfort—is increasingly incorporated into offices as a solution. One problem in designing an optimal soundscaping system relates to setting the proper masking levels. However, evaluating a soundscaping system's effectiveness in any particular space and/or understanding how to tune a soundscaping system has largely been subjective and based on general assumptions about the workplace. For example, soundscaping systems in the prior art have been tuned based on building usage (i.e., 9 am-5 pm working hours) or personnel placement (e.g., programmers who are quiet vs phone support personnel generating high speech noise). However, such assumptions may be incorrect or become outdated. Furthermore, all offices are unique with different floorplans and furniture which change the nature of distractions. Thus, basing a soundscaping system's effectiveness and tuning on such assumptions is non-optimal.

As a result, improved methods and apparatuses for soundscaping systems are needed.

BRIEF DESCRIPTION OF THE DRAWINGS

The present invention will be readily understood by the following detailed description in conjunction with the accompanying drawings, wherein like reference numerals designate like structural elements.

FIG. 3 illustrates a table of heat map data used for speech distraction visualization in one example.

DESCRIPTION OF SPECIFIC EMBODIMENTS

Figure 1:
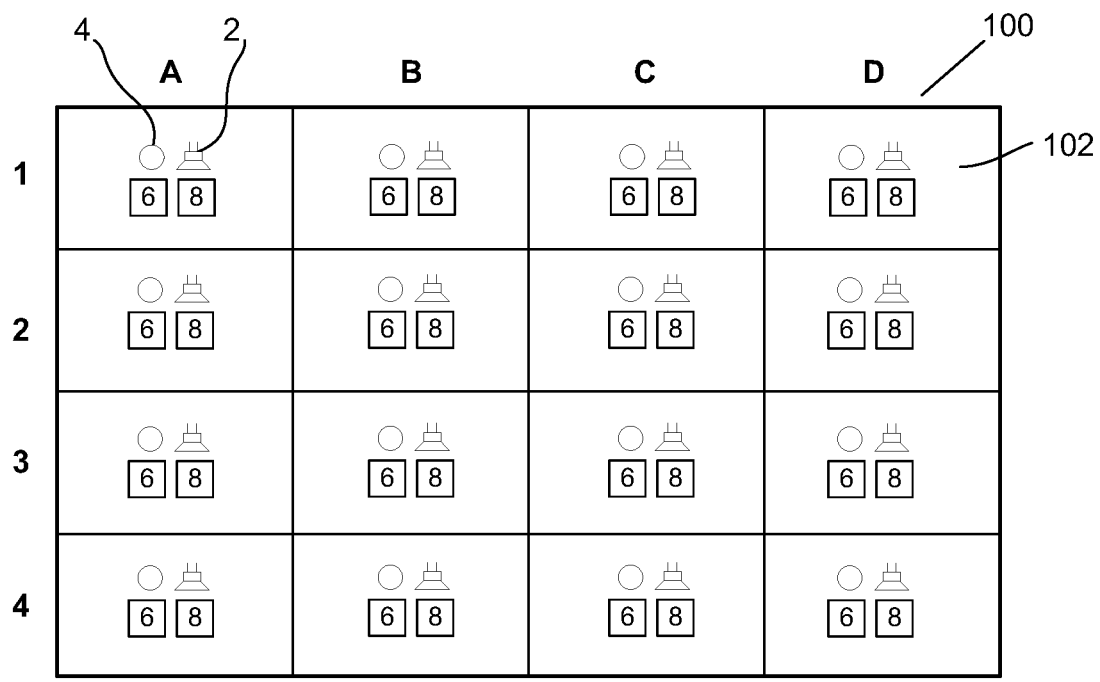
FIG. 1 illustrates a system for soundscaping and speech distraction visualization in one example.
Figure 1:
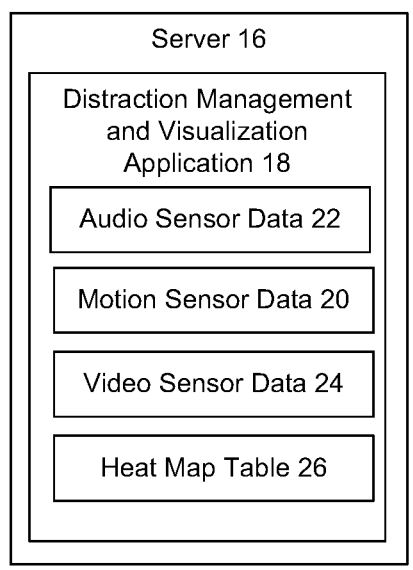

Methods and apparatuses for soundscaping systems are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

The inventors have recognized certain limitations in current soundscaping systems, including non-optimal tuning of such soundscaping systems (which may include, e.g., setting proper masking levels of sound masking output from system loudspeakers). The inventors have recognized there is a need for objective measurement methods and apparatuses which allows users to observe and quantitatively characterize distractions in a space that has a soundscaping system installed. With such methods and apparatuses, users may tune their soundscaping systems to suit the particular needs of the office. In one example, a heat map or heat map type visualization (both referred to herein as a "heat map") of identified open-office distractions facilitates evaluating soundscaping effectiveness and system tuning.

In particular, the inventors have recognized the need for improved methods and apparatuses to identify and visually indicate speech distractions. Speech noise is the top complaint of office workers about their offices. One reason for this is that speech enters readily into the brain's working memory and is therefore highly distracting. Even speech at very low levels can be highly distracting when ambient noise levels are low (as in the case of someone having a conversation in a library). Productivity losses due to speech noise have been shown in peer-reviewed laboratory studies to be as high as 41%. As real estate utilization increases and offices become more densely packed, speech noise is becoming an increasingly challenging problem. Intelligible speech decreases productivity, speech privacy, and comfort.

In one example of the invention, a real-time visualization tool that presents as a heat map distracting activity consisting of speech activity in an open space. The heat map takes the shape of a grid representing the open-office space. Each square in that grid corresponds to an area in the office space that is being monitored by a set of data collecting sensor devices. That data is captured and processed to measure the level of distraction in any given space. The more distracting an area is, the "hotter" or redder that space appears in the heat map. The data informing the creation of the heat map comes from the processing of a variety of sensor data that produces a time series of signal-to-noise ratio values qualified by voice and human presence detection. This ratio may be referred to as distraction-to-noise ratio (DNR), which is a value representing the perceptibility of a human voice above the current noise floor in a zone. Sensors may be any combination of distraction detection sensors including microphones, IR motion detectors, video, or RF proximity devices. In one example, a distraction is measured using (1) voice detection via voice activity detection (VAD) and (2) location of the source of distraction via human presence detection.

Sensor output is utilized to detect when motion is detected, a person is detected, and that person is talking. Each sensor processing block outputs a digital time series of zeros and ones (zero for 'no detection'; one for 'detection'). This data is combined in a distraction detection unit to produce a final digital stream that flags the sections of the audio waveform that represent human speech. A signal-to-nose (SNR) extraction unit uses the information contained in that final digital waveform to produce SNR values for the sections of audio that represent distracting speech. These SNR values are those plotted in the heat map to represent distraction activity in a space.

In one embodiment, only microphone data is utilized to identify voice activity and location of the distractor speech. However, VAD processing of the microphone data may not accurately identify whether there is currently voice activity or be indeterminate. For this reason, in one embodiment motion sensor and/or video sensor data is utilized in conjunction with the microphone data to determine whether there is speech in the audio data and should be classified/treated as distraction activity (i.e., visualized on the heat map). For example, where motion sensors and/or video sensors identify a human presence, the microphone output is processed as if it includes speech to generate a distraction SNR. Specifically, the only SNR values which are visualized are those during which there has been identification that there is currently voice activity. In the distraction SNR, the signal of interest (i.e., "S") is the detected speech and the noise (i.e., "N") may be ambient noise or sound masking noise output from loudspeakers.

In a system that dynamically controls soundmasking volume in response to environmental factors (speech), the system's behavior is too subtle to observe. That is, it is difficult to hear that soundmasking volume is actually changing while in a room full of people talking. As such, in one example, in addition to plotting distraction information, a heat map may also be used to visualize the output behavior of a soundscaping installation.

Advantageously, these methods and apparatuses enable soundscaping system users to monitor and manage in a more intuitive way the nature of distractions in a space. In particular, soundscaping users are enabled to make informed decisions about how to tune their soundscaping systems.

In one example embodiment of the invention, a method includes receiving an audio data from a plurality of microphones in an open space. The method includes identifying a human speech distractor presence in the open space by one or more of: (a) detecting a voice activity from the audio data, (b) receiving a motion sensor data from a plurality of motion sensors in the open space and detecting a motion activity from the motion sensor data, or (c) receiving a video sensor data from one or more video sensors in the open space and detecting a human presence from the video data. The method includes identifying a source location of the human speech distractor presence within the open space comprising utilizing one or more of the audio data, the motion sensor data, or the video data. The method further includes generating a distraction index parameter from the audio data. The method further includes visually indicating the distraction index parameter on an open space map at the source location of the human speech distractor presence.

In one example embodiment of the invention, a system includes a plurality of loudspeakers disposed in an open space, a plurality of microphones disposed in the open space to output audio data, one or more video sensors disposed in the open space to output video data, and a plurality of motion sensors disposed in the open space to output motion sensor data. The system includes one or more computing devices having one or more processors, one or more display devices, and one or more memories storing one or more application programs executable by the one or more processors. The one or more application programs include instructions to (1) identify a human speech distractor presence in the open space by one or more of (a) detecting a voice activity from the audio data, (b) detecting a motion activity from the motion sensor data, or (c) detecting a human presence from the video data. The one or more application programs further include instructions to (2) identify a source location of the human speech distractor presence within the open space by utilizing one or more of the audio data, the motion sensor data, or the video data, (3) generate a distraction index parameter from the audio data; and (4) visually indicate the distraction index parameter on an open space map at the source location of the human speech distractor presence.

In one example embodiment of the invention, a method includes receiving a motion sensor data from a plurality of motion sensors disposed within an open space or receiving a video data from one or more video sensors disposed in an open space. The method includes receiving an audio data from a plurality of microphones disposed in the open space. The method further includes detecting a voice activity from the audio sensor data, and detecting a speech level of the voice activity from the audio sensor data. The method includes identifying a distraction index parameter utilizing the audio sensor data. The method further includes identifying a source location of the voice activity in the open space utilizing the motion sensor data, video sensor data, or audio sensor data. The method includes generating a visualization of distraction activity utilizing the distraction index parameter and the source location.

FIG. 1 illustrates a system 12 for soundscaping and speech distraction visualization in one example. System 12 includes a plurality of loudspeakers 2 disposed in an open space 100, a plurality of microphones 4 disposed in the open space 100 to output audio sensor data 22, one or more video sensors 6 disposed in the open space 100 to output video sensor data 24, and a plurality of motion sensors 8 disposed in the open space 100 to output motion sensor data 20. In one example, the plurality of microphones 4 is disposed within the open space 100 in a manner wherein each microphone 4 corresponds to a region 102 (i.e., a geographic sub-unit) of the open space 100. For example, the microphone 4 is placed at the center of the region. Similarly, each region 102 may include a loudspeaker 2, video sensor 6, and motion sensor 8. Motion sensors 8 may, for example, be infrared detectors or RF proximity detectors. Video sensors 6 may, for example, be video cameras. The system 12 includes server 16 storing a distraction management and visualization application 18. In one example, the distraction management and visualization application 18 is configured to receive audio sensor data 22, motion sensor data 20, and video sensor data 24, and adjust a sound masking volume level output from the soundscaping system 12 (e.g., at one or more of the loudspeakers 2). For example, the sound masking noise is a pink noise or natural sound such as flowing water.

Placement of loudspeakers 2, stationary microphones 4, motion sensors 8, and video sensors 6 in an open space 100 in one example is shown. For example, open space 100 may be a large room of an office building in which employee workstations such as cubicles are placed. Illustrated in FIG. 1, there is one loudspeaker 2, motion sensor 8, and video sensor 6 for each microphone 4 located in a same region 102. In further examples, the ratio of loudspeakers 2, stationary microphones 4, motion sensors 8, and video sensors 6 may be varied. For example, there may be two loudspeakers 2 for each stationary microphone 4 and a single video sensor 6 may cover multiple regions.

Sound masking systems may be in-plenum or direct field. In-plenum systems involve loudspeakers installed above the ceiling tiles and below the ceiling deck. The loudspeakers are generally oriented upwards, so that the masking sound reflects off of the ceiling deck, becoming diffuse. This makes it more difficult for workers to identify the source of the masking sound and thereby makes the sound less noticeable. In one example, each loudspeaker 2 is one of a plurality of loudspeakers which are disposed in a plenum above the open space and arranged to direct the loudspeaker sound in a direction opposite the open space. Stationary microphones 4 are arranged in the ceiling to detect sound in the open space. In a further example, a direct field system is used, whereby the masking sound travels directly from the loudspeakers to a listener without interacting with any reflecting or transmitting feature.

In a further example, one or more of loudspeakers 2, stationary microphones 4, motion sensors 8, and video sensors 6 are disposed in workstation furniture located within open space 100. In one example, the loudspeakers 2 may be advantageously disposed in cubicle wall panels so that they are unobtrusive. The loudspeakers may be planar (i.e., flat panel) loudspeakers in this example to output a highly diffuse sound masking noise. Stationary microphones 4, motion sensors 8, and video sensors 6 may also be disposed in the cubicle wall panels.

Figure 10:
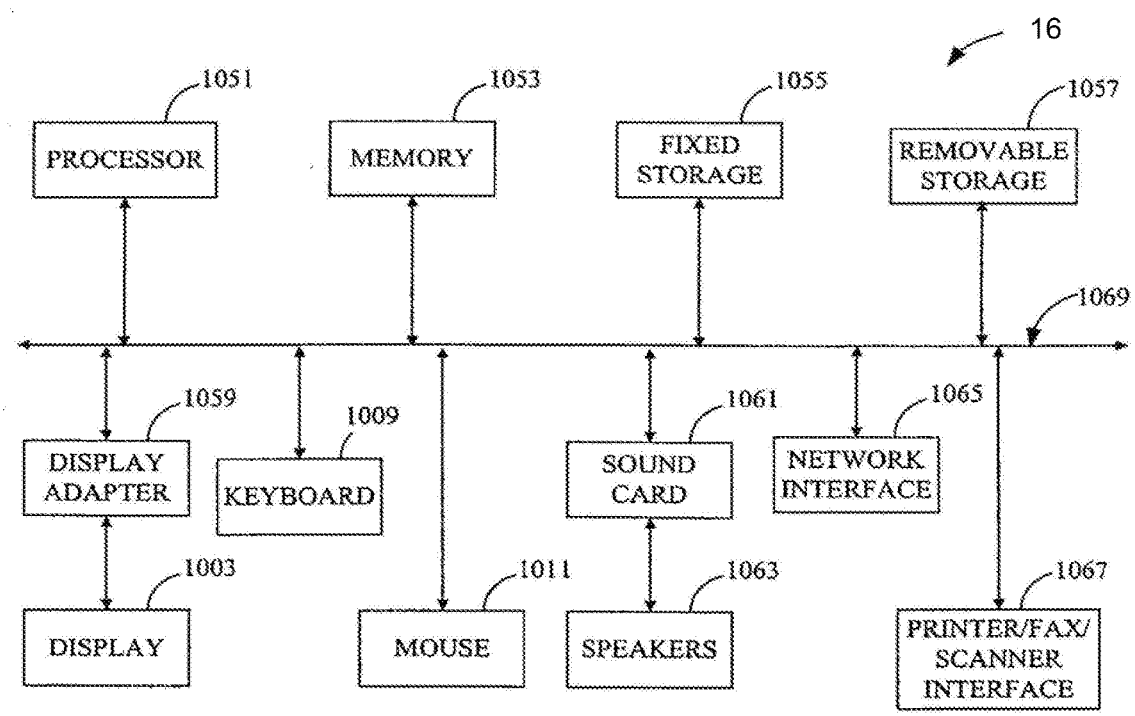
FIG. 10 illustrates a system block diagram of a server suitable for executing application programs that implement the methods and processes described herein in one example.

The server 16 includes a processor and a memory storing application programs comprising instructions executable by the processor to perform operations as described herein to receive and process microphone signals, motion sensor signals and video sensor signals, and output sound masking signals. FIG. 10 illustrates a system block diagram of a server 16 in one example. Server 16 can be implemented at a personal computer, or in further examples, functions can be distributed across both a server device and a personal computer. For example, a personal computer may display speech distraction visuals and control the output at loudspeakers 2 responsive to instructions received from a server.

Server 16 includes a distraction management and visualization application 18 interfacing with each stationary microphone 4 to receive microphone output signals (e.g., audio sensor data 22). Microphone output signals may be processed at each stationary microphone 4, at server 16, or at both. Each stationary microphone 4 transmits data to server 16. Similarly, distraction management and visualization application 18 interfaces with each video sensor 6 to receive video sensor signals (e.g., video sensor data 24). Video sensor output signals may be processed at each video sensor 6, at server 16, or at both. Distraction management and visualization application 18 interfaces with each motion sensor 8 to receive motion sensor signals (e.g., motion sensor data 20). Motion sensor output signals may be processed at each motion sensor 8, at server 16, or at both.

In one example, the distraction management and visualization application 18 is configured to receive a location data associated with each stationary microphone 4, loudspeaker 2, video sensor 6, and motion sensor 8. In one example, each microphone 4 location, speaker 2 location, video sensor 6 location, and motion sensor 8 location within open space 100 is recorded during an installation process of the server 16. For example, this location data is used to identify the source location (e.g., region) of a speech distractor within open space 100 by identifying which sensor(s) the speech distractor is closest to.

In one example, distraction management and visualization application 18 stores microphone data (i.e., audio sensor data 22) in one or more data structures. Microphone data may include unique identifiers for each microphone, measured noise levels or other microphone output data, and microphone location. For each microphone, the output data (e.g., measured noise level) is recorded for use by distraction management and visualization application 18 as described herein. Similarly, distraction management and visualization application 18 stores motion sensor data 20 and video sensor data 24 in one or more data structures.

Server 16 is capable of electronic communications with each loudspeaker 2, stationary microphone 4, video sensor 6, and motion sensor 8 via either a wired or wireless communications link 13. For example, server 16, loudspeakers 2, and stationary microphones 4 are connected via one or more communications networks such as a local area network (LAN), Internet Protocol network, IEEE 802.11 wireless network, Bluetooth network, or any combination thereof. In a further example, a separate computing device may be provided for each loudspeaker 2, stationary microphone 4, video sensor 6, and motion sensor 8 grouping.

In one example, each loudspeaker 2, stationary microphone 4, video sensor 6, and motion sensor 8 is network addressable and has a unique Internet Protocol address for individual control. Loudspeaker 2, stationary microphone 4, video sensor 6, and motion sensor 8 may include a processor operably coupled to a network interface, output transducer, memory, amplifier, and power source. Loudspeaker 2, stationary microphones 4, video sensor 6, and motion sensor 8 also include a wireless interface utilized to link with a control device such as server 16. In one example, the wireless interface is a Bluetooth or IEEE 802.11 transceiver. The processor allows for processing data, including receiving microphone signals and managing sound masking signals over the network interface, and may include a variety of processors (e.g., digital signal processors), with conventional CPUs being applicable.

In the system illustrated in FIG. 1, sound is output from loudspeakers 2 corresponding to a sound masking signal configured to mask open space noise. In one example, the sound masking signal is a random noise such as pink noise. The pink noise operates to mask open space noise heard by a person in open space 100. In one example, the masking levels are advantageously dynamically adjusted in response to the generated distraction index parameter, the noise level or other measurements received from one or more stationary microphones 4. In one example, masking levels are adjusted on a loudspeaker-by-loudspeaker basis in order to address location-specific noise levels. Differences in the noise transmission quality at particular areas within open space 100 are taken into consideration when determining output levels of the sound masking signals.

The use of a plurality of stationary microphones 4, video sensors 6, and motion sensors 8 throughout the open space 100 ensures complete coverage of the entire open space 100. Utilizing data received from these sensors, distraction management and visualization application 18 detects a presence of a noise source from the microphone output signals. Where the noise source is undesirable user speech, a voice activity is detected. A voice activity detector (VAD) is utilized in processing the microphone output signals. A loudness level of the noise source is determined. Other data may also be derived from the microphone output signals. In one example, a signal-to-noise ratio from the microphone output signal is identified. Distraction management and visualization application 18 responsively increases or reduces the volume of the sound masking to maintain an optimal masking level as speech noise levels change.

In one example, distraction management and visualization application 18 identifies a human speech distractor presence in the open space 100 by one or more of (a) detecting a voice activity from the audio sensor data 22, (b) detecting a motion activity from the motion sensor data 20, or (c) detecting a human presence from the video sensor data 24. Distraction management and visualization application 18 identifies a source location of the human speech distractor presence within the open space 100 by utilizing one or more of the audio sensor data 22, the motion sensor data 20, or the video sensor data 24. Distraction management and visualization application 18 generates a distraction index parameter from the audio sensor data 22. In one example, the distraction index parameter is a signal-to-noise ratio derived from a detected speech level in the audio sensor data 22 and a baseline noise floor also determined from audio sensor data 22. In a further example, the distraction index parameter is the detected speech level itself (i.e., the measured raw signal level when voice activity is identified).

FIG. 3 illustrates a distraction visualization table 26 of heat map data in one example. For example, distraction visualization table 26 is generated from audio sensor data 22, motion sensor data 20, and video sensor data 24, and processed as described in FIG. 2. Distraction visualization table 26 includes location/region data 302, motion data 304, VAD data 306, facial presence data 308, measured noise level 310, and Distraction SNR 312. For each location/region 302, distraction activity is recorded. In the example illustrated in FIG. 3, Distraction SNR2 is plotted on a heat map at Location A2. In addition to measured noise levels 310, any gathered or measured parameter derived from microphone output data may be stored. Data in one or more data fields in the table may be obtained using a database and lookup mechanism.

Figure 5:
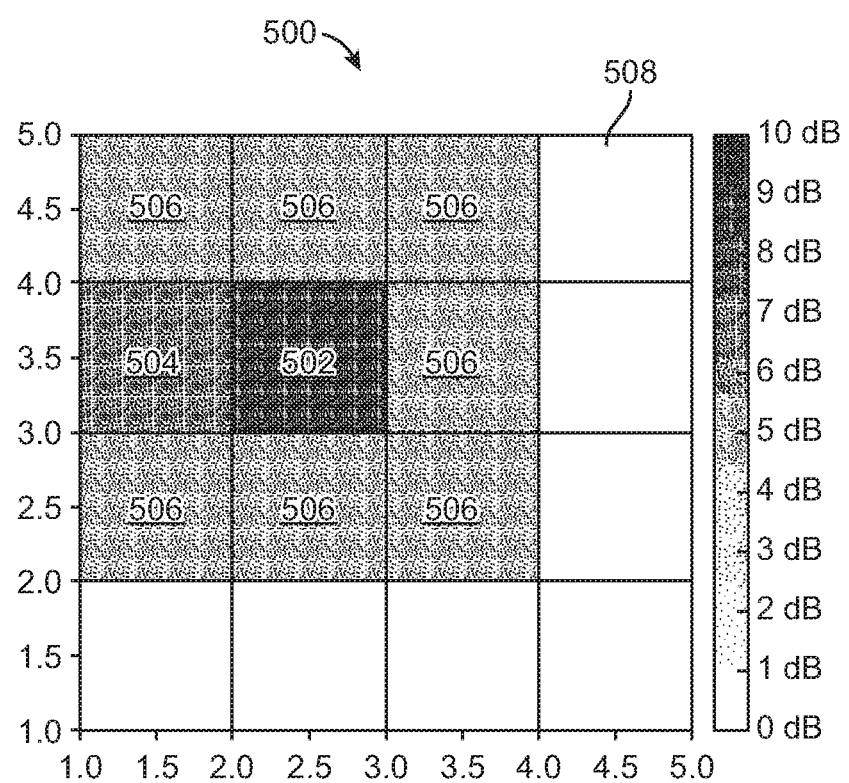
FIG. 5 illustrates a heat map of distraction activity in an open space in an example where there is a hot spot of distraction and potential spread of distraction in the surrounding space.

Distraction management and visualization application 18 visually indicates the distraction index parameter on an open space 100 map at the source location of the human speech distractor presence. In one example, the visual indication is a "heat map" of speech distraction (as referred to by the inventor) which is generated and shown. FIG. 5 illustrates a heat map 500 of distraction activity in an open space in an example where there is a hot spot (e.g., in region 502) of distraction and potential spread of distraction in the surrounding space. Heat map 500 is a real-time visualization tool that presents as a heat map distracting activity in an open space. In one example, heat map 500 takes the shape of a grid representing the open-office space 100. For example, FIG. 5 represents an open-office space with 16 regions (also referred to as areas or partitions). Each square in that grid corresponds to an area in the office space that is being monitored by a set of data collecting sensor devices. That data is captured and processed to measure the level of distraction in any given space. The more distracting an area is, the "hotter" or "redder" that space appears in the heat map 500. In one embodiment, actual color is utilized to differentiate hot spots, such as the use of the color red to indicate a high or maximum level of distraction activity. In further examples, other graphical tools may be utilized to differentiate varying levels of distraction activity. For example, as shown in FIG. 5, regions 502, 504, and 506 indicate hot spots of distraction activity, wherein the level of distraction is greatest at region 502, with decreasing levels of distraction at region 504 followed by region 506. At region 508, there may or may not be noise which has been detected, but no distracting voice activity (i.e., speech) has been identified and therefore no "heat" is visualized.

As described herein, the data informing the creation of the heat map 500 comes from the processing of a variety of sensor data that produces a time series of signal-to-noise ratio values qualified by voice and human presence detection. This ratio may be referred to as distraction-to-noise ratio (DNR), which is a value representing the perceptibility of a human voice above the current noise floor in a zone. Sensors may be any combination of distraction detection sensors including microphones, IR motion detectors, video, or RF proximity devices. The distraction can be measured using (1) voice detection via voice activity detection (VAD) and (2) location of the source of distraction via human presence detection.

Figure 2:
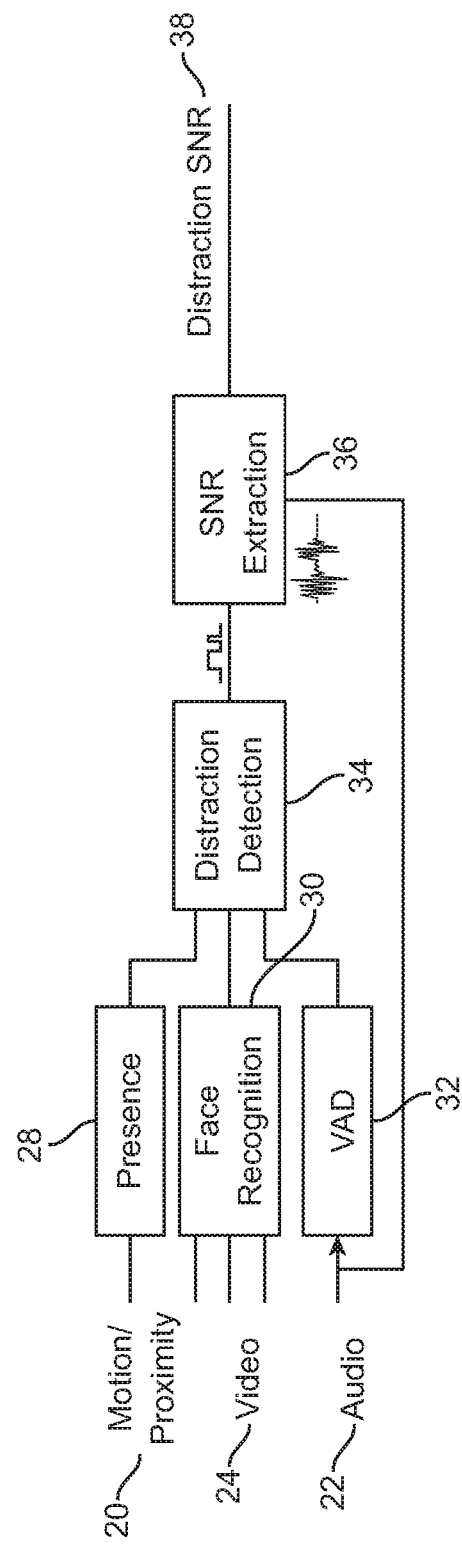
FIG. 2 illustrates a simplified block diagram of data flow and analysis in the system shown in FIG. 1.
Figure 4:
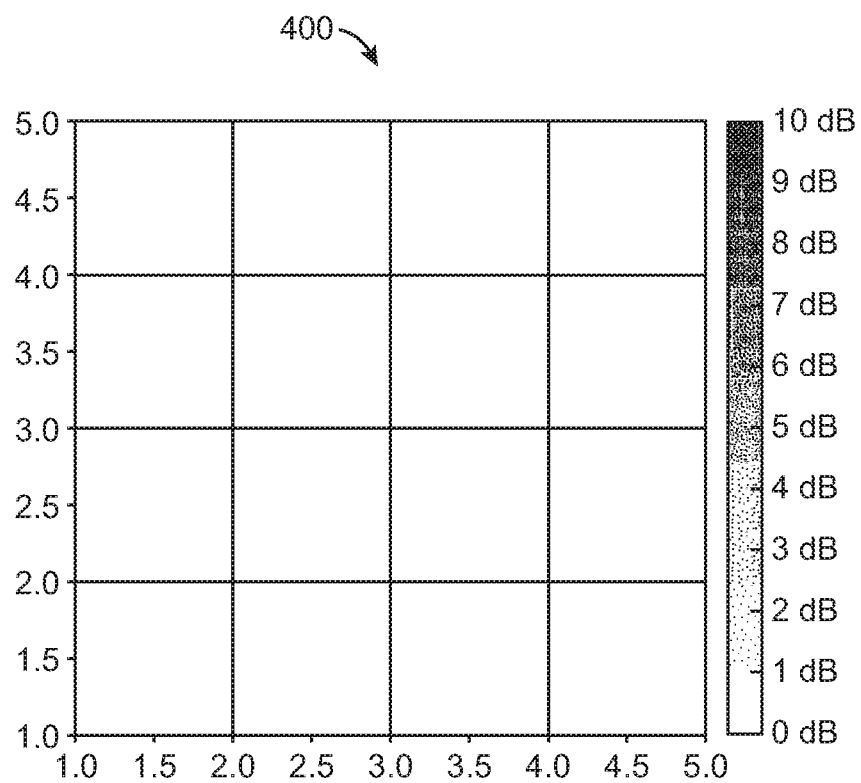
FIG. 4 illustrates a heat map of distraction activity in an open space in an example where there is close to silence in the open space.

FIG. 2 illustrates a simplified block diagram of data flow and analysis in the system shown in FIG. 1 in one example. Presence block 28, Face Recognition block 30, and VAD block 32 detect when motion is detected from motion sensor data 20, a person is detected from video sensor data 24, and that person is talking from audio sensor data 22, respectively. In one example, face recognition block 30 identifies that a human face is merely present and need not identify the identity of the person. Each block outputs a digital time series of zeros and ones (zero for 'no detection'; one for 'detection'). This data is combined in the Distraction Detection block 34 to produce a final digital stream that flags the sections of the audio waveform that represent human speech. The SNR Extraction block 36 uses the information contained in that final digital waveform to produce SNR values 38 for the sections of audio that represent distracting speech. These SNR values 38 are those plotted in the heat map 500 to represent distraction activity in a space. In contrast to FIG. 5, FIG. 4 illustrates a heat map 400 of distraction activity in an open space in an example where all of the detected noise does not originate from human speech or there is close to silence in the open space.

Figure 7:
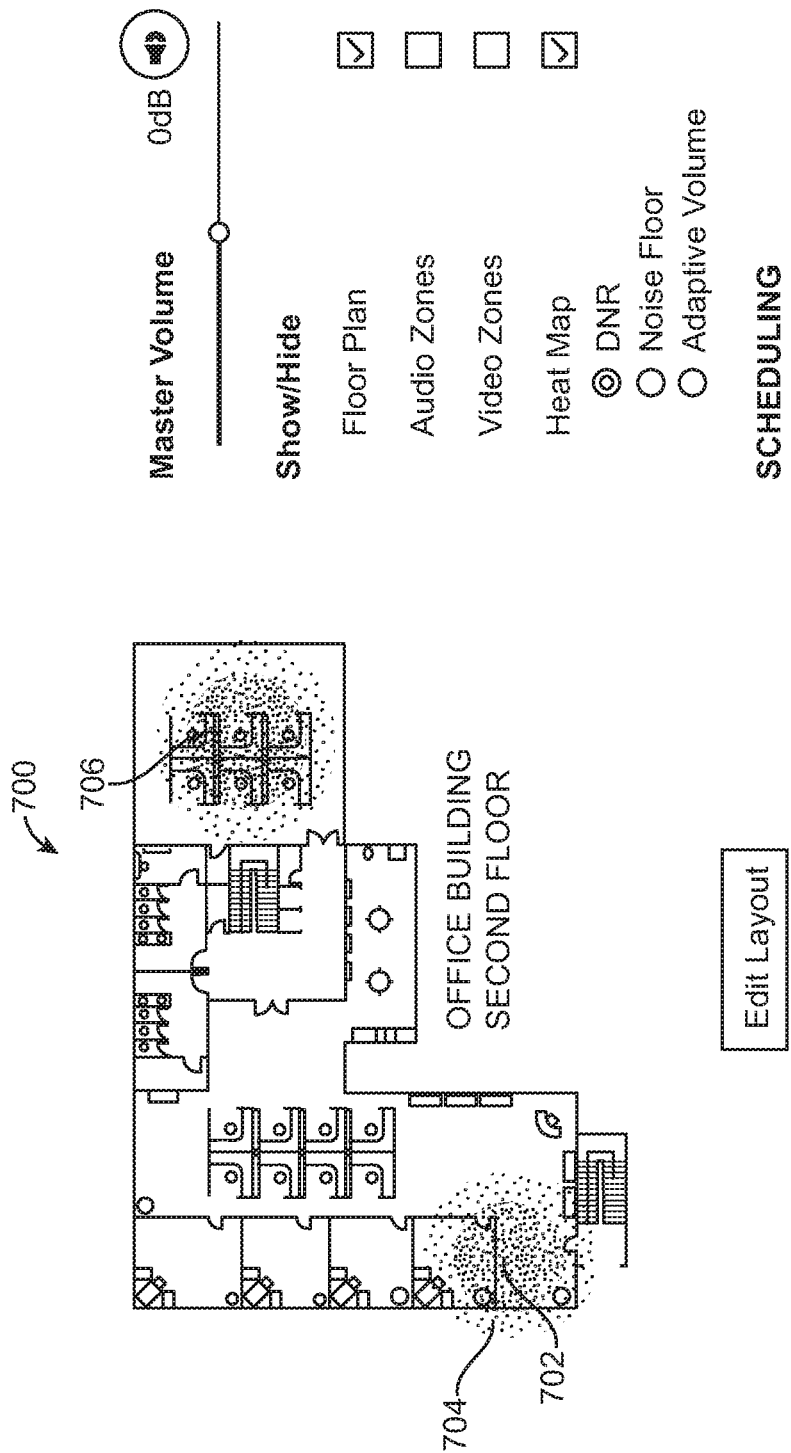
FIG. 7 illustrates a floor plan of an open space with a heat map of acoustic events.

In one example, distraction management and visualization application 18 visually indicates a value of the distraction index parameter by color and radius extending from the source location. Distraction management and visualization application 18 may generate and display a time-lapse visualization of the distraction index parameter. In this example, visualizations are generated by superimposing soundscaping zones (e.g., regions) over a floorplan (image) of an end-user's environment and dividing map/zones into equidistant intervals. In one example, each interval center may be the origin for visualizing an acoustic event (e.g., distracting speech activity). In one example, the precise location of the acoustic event as described above is used as the origin for visualizing the acoustic event. Acoustic events in each zone are accumulated over a time window, which determines the radius and color of events visualized on the heat map. The time window used for accumulating acoustic events may be the same as the time window used to visualize adaptability, which assists in understanding correspondence between distractions in an environment and the system's response. FIG. 7 illustrates a floor plan of an open space with a heat map 700 of distraction activity and soundscaping regions overlaid.

The more distracting an area is, the "hotter" or "redder" that space appears in the heat map 700 and the greater the radius of the circle used to visualize the acoustic events. In one embodiment, actual color is utilized to differentiate hot spots, such as the use of the color red to indicate a high or maximum level of distraction activity. In further examples, other graphical tools (e.g., stippling or similar) may be utilized to differentiate varying levels of distraction activity. For example, as shown in FIG. 7, areas 702, 704, and 706 indicate hot spots of distraction activity, wherein the level of distraction is greater at region 702 relative to region 704 as region 704 illustrates the decay of the speech distraction further from the acoustic event center. Areas outside of region 704 represent areas where the speech distraction is no longer audible.

Figure 6:
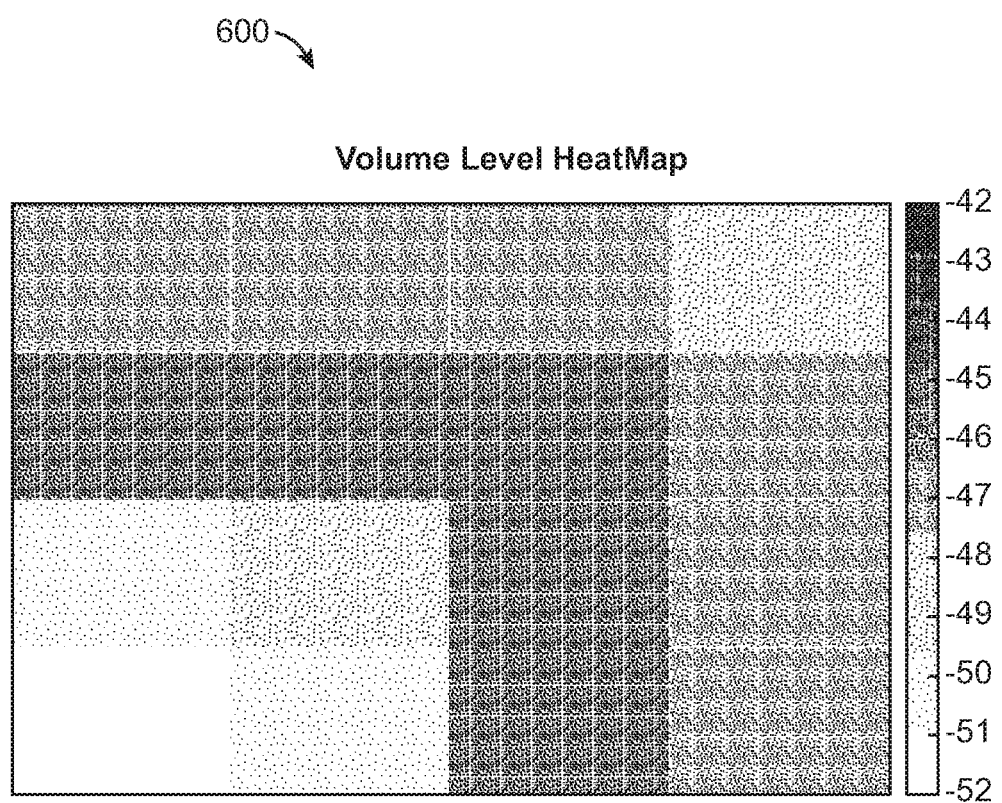
FIG. 6 illustrates output of a sound masking noise in an open space in an example operation of the sound masking and speech distraction visualization system shown in FIG. 1.

In one example, distraction management and visualization application 18 adjusts an output of sound masking noise from the plurality of loudspeakers 2 utilizing the distraction index parameter and visually indicates the output of sound masking noise on an open space 100 map by region 102. FIG. 6 illustrates output of a sound masking noise in an open space in an example operation of the sound masking and speech distraction visualization system shown in FIG. 1. Illustrated in FIG. 6 is a heat map 600 of the volume level (V) of the output of noise masking sounds at loudspeakers in an open space 100, which includes response to detected speech distraction events (e.g., distraction SNR).

Heat map 600 is used to visualize the output behavior of a soundscaping installation. In a system that dynamically controls sound masking volume in response to environmental factors (speech), the system's behavior is too subtle to observe. That is, it is difficult to hear that sound masking volume is actually changing while in a room full of people talking. A better way to verify that the system is actually behaving as expected is to plot this data on the heat map 600. Each square in the grid represents an area within the overall soundscaping space. The greater the volume level output, the "hotter" or "redder" that space appears in the heat map 600. In one embodiment, actual color is utilized to differentiate volume levels. In further examples, other graphical tools (e.g., stippling or similar) may be utilized to differentiate varying output volume levels, as shown in FIG. 6. Advantageously, three different heat maps can be generated on demand, for visualizing each of: noise floor, inputs/distractions (i.e., DNR) that affect the system, and the outputs (i.e. volume control, adaptability) with which the system responds.

Figure 8:
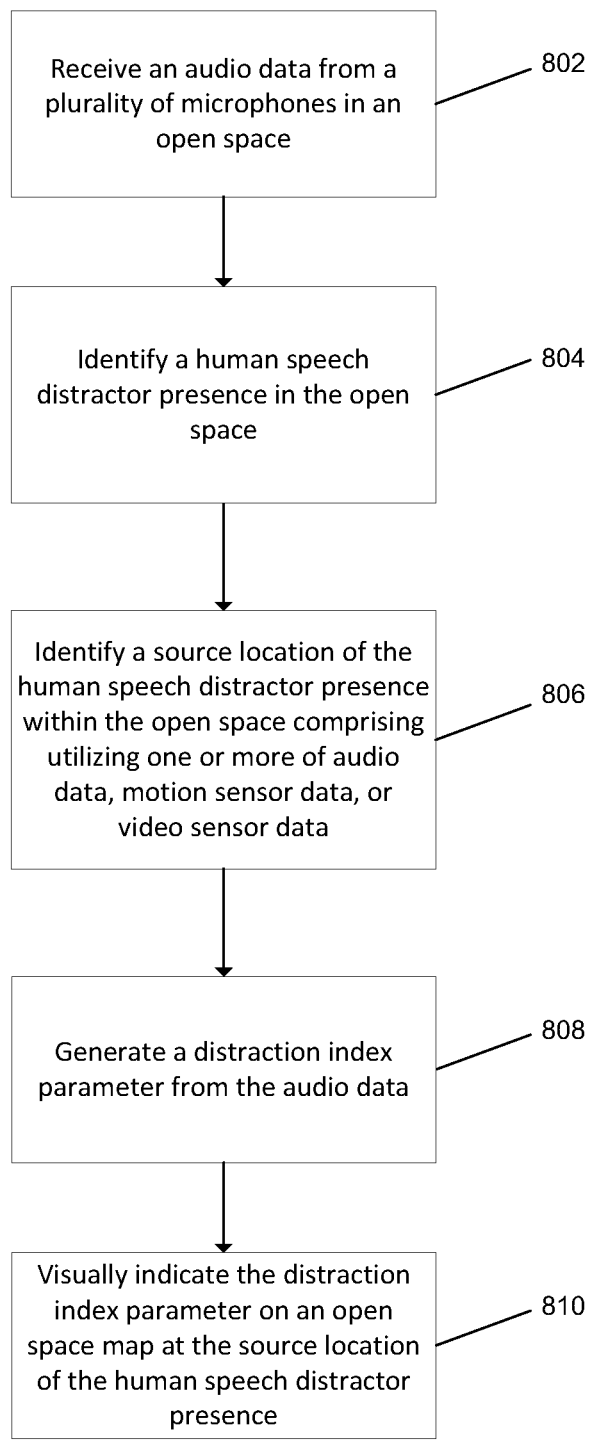
FIG. 8 is a flow diagram illustrating generating and visualizing a distraction index parameter in one example.

In various embodiments, the techniques of FIGS. 8-9 discussed below may be implemented as sequences of instructions executed by one or more electronic systems. FIG. 8 is a flow diagram illustrating generating and visualizing a distraction index parameter in one example. For example, the process illustrated may be implemented by the system shown in FIG. 1.

At block 802, an audio data is received from a plurality of microphones in an open space. In one example, the plurality of microphones are disposed within the open space in a manner wherein each microphone of the plurality of microphones corresponds to a region of the open space.

At block 804, a human speech distractor presence in the open space is identified. This may include one or more of detecting a voice activity from the audio data, receiving a motion sensor data from a plurality of motion sensors in the open space and detecting a motion activity from the motion sensor data, or receiving a video sensor data from one or more video sensors in the open space and detecting a human presence from the video sensor data.

At block 806, a source location of the human speech distractor presence within the open space is identified including utilizing one or more of the audio data, the motion sensor data, or the video sensor data. At block 808, a distraction index parameter is generated from the audio data. In one example, the distraction index parameter is a signal-to-noise ratio derived from a detected speech level during periods of voice activity in the audio data.

At block 810, the distraction index parameter is visually indicated on an open space map at the source location of the human speech distractor presence. In one example, visually indicating the distraction index parameter on an open space map at the source location of the human speech distractor presence comprises indicating a value of the distraction index parameter by color and radius extending from the source location. In one example, visually indicating the distraction index parameter on an open space map at the source location of the human speech distractor presence comprises displaying a time-lapse visualization of the distraction index parameter.

In one example, the process further includes adjusting an output of sound masking noise from a sound masking system utilizing the distraction index parameter. The process further includes visually indicating the output of sound masking noise on an open space map by region.

Figure 9A:
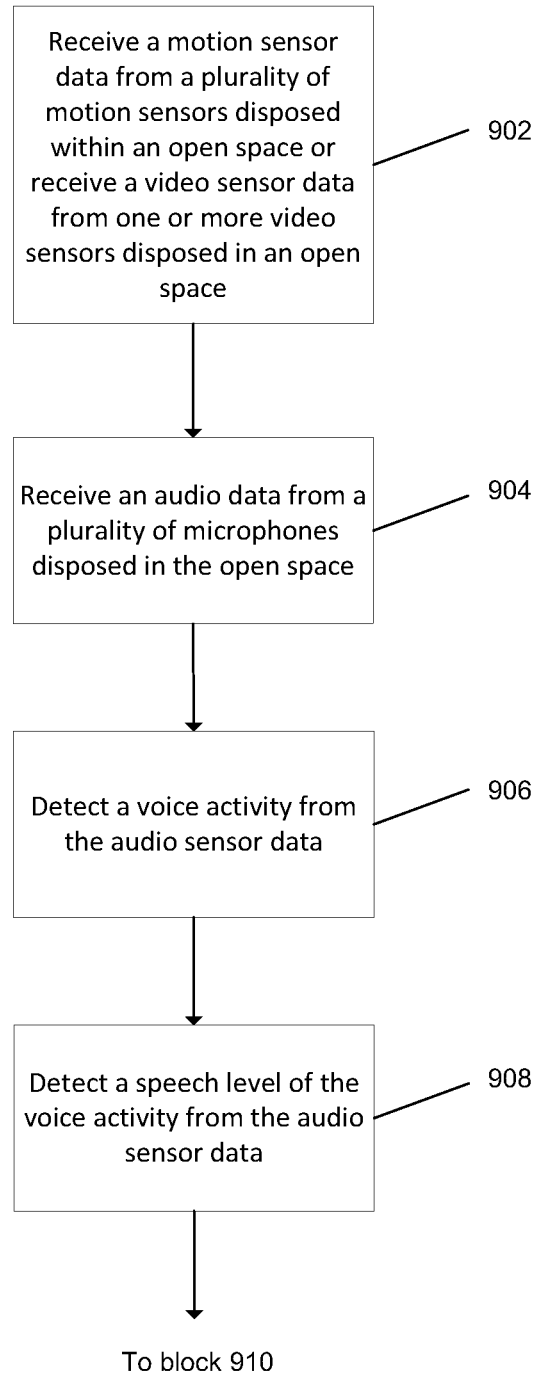
FIGS. 9A-9B are a flow diagram illustrating generating and visualizing a distraction index parameter in one example.
Figure 9B:
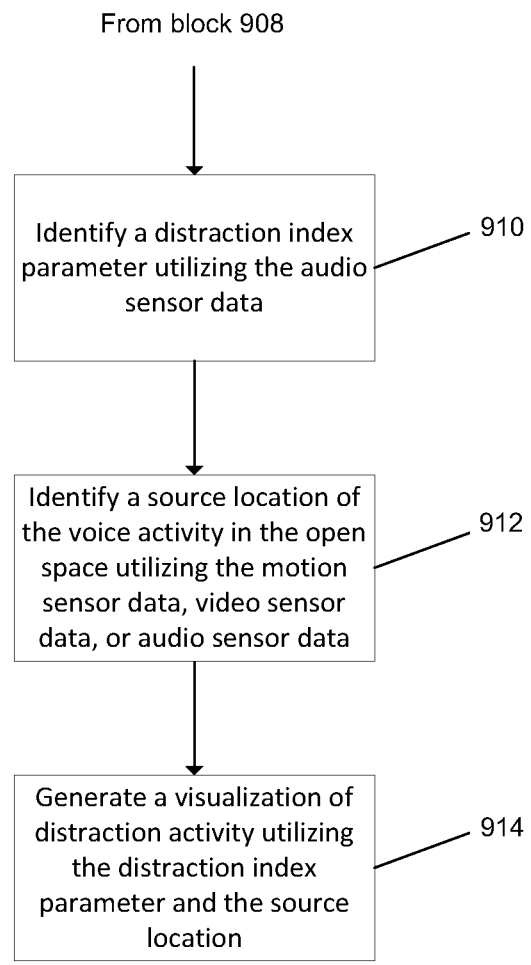

FIGS. 9A-9B are a flow diagram illustrating generating and visualizing a distraction index parameter in one example. At block 902, a motion sensor data is received from a plurality of motion sensors disposed within an open space or a video sensor data is received from one or more video sensors disposed in an open space. At block 904, an audio data is received from a plurality of microphones disposed in the open space. In one example, the plurality of microphones are disposed within the open space in a manner wherein each microphone of the plurality of microphones corresponds to a region of the open space.

At block 906, a voice activity is detected from the audio sensor data. At block 908, a speech level of the voice activity is detected from the audio sensor data. At block 910, a distraction index parameter is identified utilizing the audio sensor data. In one example, the distraction index parameter utilizing the audio sensor data comprises a signal-to-noise ratio during periods of voice activity determined utilizing the speech level and a baseline noise level determined from the audio data.

At block 912, a source location of the voice activity in the open space is identified utilizing the motion sensor data, video sensor data, or audio sensor data. At block 914, a visualization of distraction activity is generated utilizing the distraction index parameter and the source location. In one example, generating the visualization of distraction activity based upon the distraction index parameter comprises indicating the source location of the voice activity on an open space floor plan map and indicating the values of the distraction index parameter by color and radius extending from the source location. In one example, generating the visualization of distraction activity comprises displaying a time-lapse accumulation of acoustic events. For example, average, minimum, and maximum values of the distraction index parameter may be displayed.

In one example, the process further includes adjusting an output of sound masking noise from a sound masking system utilizing the distraction index parameter. The process further includes generating a heat map visualization on a video display showing an output of the sound masking noise by region of the open space.

FIG. 10 illustrates a system block diagram of a server 16 suitable for executing application programs that implement the methods and processes described herein in one example.

The architecture and configuration of the server 16 shown and described herein are merely illustrative and other computer system architectures and configurations may also be utilized.

The exemplary server 16 includes a display 1003, a keyboard 1009, and a mouse 1011, one or more drives to read a computer readable storage medium, a system memory 1053, and a hard drive 1055 which can be utilized to store and/or retrieve software programs incorporating computer codes that implement the methods and processes described herein and/or data for use with the software programs, for example. For example, the computer readable storage medium may be a CD readable by a corresponding CD-ROM or CD-RW drive 1013 or a flash memory readable by a corresponding flash memory drive. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as optical disks, and specially configured hardware devices such as application-specific integrated circuits (ASICs), programmable logic devices (PLDs), and ROM and RAM devices.

The server 16 includes various subsystems such as a microprocessor 1051 (also referred to as a CPU or central processing unit), system memory 1053, fixed storage 1055 (such as a hard drive), removable storage 1057 (such as a flash memory drive), display adapter 1059, sound card 1061, transducers 1063 (such as loudspeakers and microphones), network interface 1065, and/or printer/fax/scanner interface 1067. The server 16 also includes a system bus 1069. However, the specific buses shown are merely illustrative of any interconnection scheme serving to link the various subsystems. For example, a local bus can be utilized to connect the central processor to the system memory and display adapter. Methods and processes described herein may be executed solely upon CPU 1051 and/or may be performed across a network such as the Internet, intranet networks, or LANs (local area networks) in conjunction with a remote CPU that shares a portion of the processing.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method comprising:
   receiving an audio data from a plurality of stationary microphones disposed in at least one of a plurality of workstation furniture in an open space and a ceiling area of the open space to output the audio data, wherein the plurality of stationary microphones are distributed throughout the open space in a grid pattern;
   receiving a motion sensor data from a plurality of motion sensors in the open space or receiving a video sensor data from one or more video sensors in the open space;
   identifying a human speech distractor presence in the audio data comprising:
      processing the audio data to detect a voice activity; and
      detecting a motion activity from the motion sensor data or detecting a human presence from the video sensor data;
   identifying a source location of the human speech distractor presence within the open space comprising utilizing one or more of the audio data, the motion sensor data, or the video sensor data;
   generating a distraction index parameter comprising a ratio of a detected speech to a sound masking noise output, the detected speech and the sound masking noise output determined from the audio data; and
   visually indicating the distraction index parameter comprising the ratio of the detected speech to the sound masking noise output on an open space map at the source location of the human speech distractor presence.

2. The method of claim 1, wherein the distraction index parameter comprises a signal-to-noise ratio derived from a detected speech level during periods of voice activity in the audio data.

3. The method of claim 1, wherein visually indicating the distraction index parameter on the open space map at the source location of the human speech distractor presence comprises indicating a value of the distraction index parameter by color and radius extending from the source location.

4. The method of claim 1, wherein visually indicating the distraction index parameter on the open space map at the source location of the human speech distractor presence comprises displaying a time-lapse visualization of the distraction index parameter.

5. The method of claim 1, further comprising adjusting an output of sound masking noise from a sound masking system utilizing the distraction index parameter.

6. The method of claim 5, further comprising visually indicating the output of sound masking noise on an open space map by region.

7. A method comprising:
   receiving a motion sensor data from a plurality of motion sensors disposed within an open space or receiving a video sensor data from one or more video sensors disposed in the open space;
   receiving an audio sensor data from a plurality of stationary microphones disposed in at least one of a plurality of workstation furniture in the open space and a ceiling area of the open space to output the audio sensor data, wherein the plurality of stationary microphones are distributed throughout the open space in a grid pattern;

detecting a voice activity in the audio sensor data comprising:
processing the audio sensor data to detect the voice activity; and
detecting a motion activity from the motion sensor data or detecting a human presence from the video sensor data;
detecting a speech level of the voice activity from the audio sensor data;
detecting a sound masking noise output from the audio sensor data,
identifying a distraction index parameter comprising a ratio of the speech level to the sound masking noise output utilizing the audio sensor data;
identifying a source location of the voice activity in the open space utilizing the motion sensor data, video sensor data, or audio sensor data;
generating a visualization of distraction activity utilizing the distraction index parameter comprising the ratio of the speech level to the sound masking noise output and the source location.

8. The method of claim 7, wherein the distraction index parameter utilizing the audio sensor data comprises a signal-to-noise ratio determined utilizing the speech level during periods of voice activity and a baseline noise level determined from the audio sensor data.

9. The method of claim 7, wherein generating the visualization of distraction activity based upon the distraction index parameter comprises indicating the source location of the voice activity on an open space floor plan map and indicating a value of the distraction index parameter by color and radius extending from the source location.

10. The method of claim 7, wherein generating the visualization of distraction activity comprises displaying a time-lapse accumulation of acoustic events.

11. The method of claim 7, further comprising:
adjusting an output of a sound masking noise from a sound masking system utilizing the distraction index parameter.

12. The method of claim 11, further comprising: generating a heat map visualization on a video display showing the output of the sound masking noise by region of the open space.

13. A system comprising:
a sound masking system providing a sound masking noise output;
a plurality of loudspeakers disposed in an open space;
a plurality of stationary microphones disposed in at least one of a plurality of workstation furniture in the open space and a ceiling area of the open space to output an audio data, wherein the plurality of stationary microphones are distributed throughout the open space in a grid pattern;
one or more video sensors disposed in the open space to output a video sensor data;
a plurality of motion sensors disposed in the open space to output a motion sensor data; and
one or more computing devices comprising:
one or more processors;
one or more display devices;
one or more memories storing one or more application programs executable by the one or more processors, the one or more application programs comprising instructions to:
identify a human speech distractor presence in the audio data by processing the audio data to detect a voice activity, and detecting a motion activity from the motion sensor data or detecting a human presence from the video sensor data;
identify a source location of the human speech distractor presence within the open space by utilizing one or more of the audio data, the motion sensor data, or the video sensor data;
generate a distraction index parameter comprising a ratio of a detected speech to the sound masking noise output from the audio data; and
visually indicate the distraction index parameter comprising the ratio of the detected speech to the sound masking noise output on an open space map at the source location of the human speech distractor presence.

14. The system of claim 13, wherein the distraction index parameter comprises a signal-to-noise ratio derived from a detected speech level in the audio data during periods of voice activity.

15. The system of claim 13, wherein the instructions to visually indicate the distraction index parameter on the open space map at the source location of the human speech distractor presence comprises instructions to indicate a value of the distraction index parameter by color and radius extending from the source location.

16. The system of claim 13, wherein the instructions to visually indicate the distraction index parameter on the open space map at the source location of the human speech distractor presence comprises instructions to display a time-lapse visualization of the distraction index parameter.

17. The system of claim 13, wherein the instructions further include instructions to adjust an output of sound masking noise from the plurality of loudspeakers utilizing the distraction index parameter and visually indicate the output of sound masking noise on an open space map by region.

* * * * *